United States Patent Office 3,018,264
Patented Jan. 23, 1962

3,018,264
POLYEPOXIDE COMPOSITIONS
William G. Colclough, Jr., Somerville, N.J., assignor to Union Carbide Corporation, a corporation of New York
No Drawing. Filed Nov. 25, 1957, Ser. No. 698,359
16 Claims. (Cl. 260—37)

This invention relates to a latent chemical acting system and to polyepoxide compositions containing the latent chemical acting system.

Conventionally, polyepoxide compositions are cured to hard and durable products, having excellent electrical and chemical resistivity, by admixing therewith a measured amount of a curing agent whereby the resin undergoes a further reaction and cures to a tough, hard infusible product. The requirement that the polyepoxide composition and curing agent must be intimately admixed in exact proportions before usage has presented serious practical difficulties in many diverse industries, illustrative of which is the molding industry. Molders do not have the necessary equipment required to intimately blend the polyepoxide compositions and curing agents. It is necessary, therefore, that the polyepoxide and curing agent be premixed by the supplier prior to shipping to the molder. It is, therefore, necessary that the premixed composition be stable and have a long storage life in order that the composition does not cure to an infusible, unworkable state prior to its being molded or otherwise worked into the desired product.

It has been suggested that latent acting curing agents be employed with polyepoxide compositions in order to obtain a composition having a long storage life, and fast cure time, upon release or activation of the curing agent. Up until the present time, however, with latent acting curing agents that are presently available, a composition containing these agents had a short storage life. The conventional latent acting curing agents are of the type wherein a material which is unreactive per se is introduced into a polyepoxide composition and undergoes, at elevated temperatures, a self-reaction or a reaction with another component of the system to form a reactive material. The reactive material, which is formed, reacts with the reactive components of the composition or catalyzes the reaction between these reactive components.

In actual practice, current-day latent acting curing agents are active even at room temperature, with their activity increasing with increasing temperature. Consequently, as some reaction occurs even at room temperature, polyepoxide compositions to which this type curing agent is added are not chemically stable and consequently do not have good storage life at normal storage temperatures. The current-day latent acting curing agents are also undesirable because of the uncertainty and unpredictability surrounding the "in situ" chemical reaction. As an illustration, a small difference in the moisture content or pH of the composition containing the latent acting agent, or the presence therein of a trace of an impurity can seriously affect the extent to which the reaction proceeds and consequently the amount of reactive material formed.

I have found that the aforementioned problems of premature activity at normal storage temperature with respect to polyepoxide compositions can be overcome by utilizing a latent chemical acting system comprising a curing agent, a molecular sieve carrier into which the curing agent is adsorbed and a coating material encasing the curing agent containing carrier, the coating material acting as a mechanical barrier between the curing agent and polyepoxide composition and being relatively non-reactive with the curing agent, the molecular sieve carrier and the polyepoxide composition but which, when subjected to a temperature which melts it, becomes discontinuous and allows the chemical agent freedom of movement from the molecular sieve carrier. The curing agent is able to react with or catalyze the reaction between the normally reactive components of the composition upon being driven therefrom by an outside force such as heat whereupon the composition cures to a hard, infusible product.

My invention allows a premixing of polyepoxide compositions with the latent chemical acting system in desired and controlled proportions to form a mixture which is stable at normal storage temperatures and, therefore, has a long storage life as the curing agent is not prematurely released. My latent chemical acting system also offers the advantage that different triggering temperatures can be provided by choosing a coating material having the appropriate melting point, thus presenting a wide choice of temperatures at which the chemical agent can be released.

The carriers of this invention are the molecular sieves, illustrative of which are the zeolite sieves. The zeolite sieves are composed of soda, lime, alumina and silica. These molecular sieves have an unusual selectivity determined by the characteristics of the molecules that are to be adsorbed as, for instance, size and polarity. The atoms in the zeolite molecular sieves are arranged in a definite crystalline pattern containing a large number of small cavities, interconnected by a number of smaller holes or pores. Normally, these cavities contain water molecules which can be driven off by heat. When the water is driven off, the physical structure of the crystal remains unchanged and contains a network of empty pores and cavities which comprise almost half the total amount of the crystals. The adsorption of the curing agent takes place in these pores. Upon the application of heat the molecular sieves readily release the curing agents.

The preferred molecular sieve together with a process for its preparation is described in detail in U.S. patent application Serial No. 400,389, filed December 24, 1953 now U.S. Patent 2,882,244, said sieve being hereinafter identified as Zeolite X.

Any suitable material may be used as the barrier coating, but those having a relatively sharp melting point and which do not substantially react with the carrier, curing agent, and the composition to which the latent chemical system is added are preferred. For example, a coating material which starts to melt at about 100° C. and melts to a fluid condition at 110° C. provides a substantially complete barrier action at temperatures below 100° C. and substantially no barrier action at temperatures above 110° C. and is, therefore, suitable for my invention.

Among suitable barrier coating materials may be mentioned polyethylene, polyamide, the polyethylene glycols, and the mineral, vegetable and synthetic waxes.

Generally, the latent chemical acting system of this invention is prepared by forming a slurry of the molecular sieves in a liquid medium such as benzene or toluene. The slurry is agitated while adding thereto a liquid curing agent.

The mixture is then heated and refluxed until substantial quantities of the curing agent are taken up by the carrier material. The liquid hydrocarbon is thereafter removed by conventional distillation techniques. In cases where the curing agent is a gas the molecular sieve carrier is impregnated with the said gas using conventional impregnating procedures.

Generally, the polyepoxides which may be cured include those containing more than one reactive epoxy group:

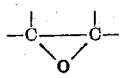

in their molecule. The polyepoxides may be saturated or unsaturated, aliphatic, cycloaliphatic, aromatic or heterocyclic and may be substituted with non-intereferring substitutents. The polyepoxide may be either monomeric or polymeric. The epoxy may be either present as a terminal or interior group.

In referring to the polyepoxides, reference is made to the epoxy equivalent weight. The term "epoxy equivalent weight" refers to weight of polyepoxide containing an equivalent of epoxide. The epoxy functionality is obtained by dividing the average molecular weight of the polyepoxide by the epoxide equivalent weight. Values for epoxy terms discussed above are based on data obtained by heating a weighed sample of the polyepoxide with an excess of 0.2 N pyridinium chloride in chloroform solution at the boiling point under reflux for two hours whereby the pyridinium hydrochloride hydrochlorinates the epoxy groups to chlorohydrin groups. After cooling, the excess pyridinium chloride is back-titrated with 0.1 N sodium hydroxide in methanol to the phenolphthalein end point. If the polyepoxides are single monomeric compounds having all their epoxide groups intact, their epoxy functionality will be whole numbers such as 2, 3, 4, 5, etc., per each polyepoxide molecule. In the case of polymeric polyepoxides, the materials may contain some of the monomeric monoepoxides or have their epoxy groups hydrated or otherwise reacted and/or contain higher molecular weight molecules so that the epoxy functionality may be low and have fractional values. The polymeric material may, for example, have epoxy functionality values such as 1.5, 1.8, etc., per each molecule.

Illustrative of the monomeric type polyepoxide compounds are the following: vinyl cyclohexene dioxide, epoxidized soybean oil, butadiene dioxide, 1,4-bis(epoxypropoxy)benzene, 1,3-bis(2,3-epoxypropoxy)cyclohexane, 4,4-bis(2-hydroxy-3,4-epoxybutoxy)diphenyldimethylmethane, 1,3-bis(4,5-epoxypentoxy)5-chlorobenzene, 1,4-bis(3,4-epoxybutoxy)-2-chlorocyclohexane 3,4-epoxy-6-methyl cyclohexylmethyl-3-4-epoxy-6 methyl cyclohexane carboxylate, 1,3-bis(2-hydroxy-3,4-epoxybutoxy)benzene, 1,4-bis(2-hydroxy-4,5-epoxypentoxy)benzene, 1,2,5,6-diepoxy-3-hexyne, 1,2,5,6-diepoxyhexane and 1,2,3,4-tetra (2-hydroxy-3,4-epoxybutoxy)butane.

Other compounds of this type include the glycidyl polyethers of polyhydric phenols obtained by reacting mixtures containing a molar amount of a polyhydric phenol with a stoichiometric excess, i.e. 3 to 6 moles per each phenolic hydroxyl group, of an epihalohydrin in an alkaline medium, and also polyglycidyl esters, such as are prepared by reacting an epihalohydrin with a salt of a polybasic acid.

Among such monomeric polyglycidyl ethers and esters may be mentioned the diglycidyl ether of bis(4-hydroxyphenyl)-dimethylmethane, the diglycidyl ether of bis(4-hydroxy-phenyl)-methane, diglycidyl ester of adipic acid, and diglycidyl ester of phthalic acid.

Other polyhydric phenols that can be reacted with epihalohydrin include the mononuclear polyhydric phenols such as resorcinol and pyrogallol, the di-or polynuclear phenols such as the bisphenols described in the Bender et al. Patent 2,506,486, and the polyphenylols such as the novolak condensation product of a phenol and a saturated or unsaturated aldehyde, containing an average of from 3 to 20 or more phenylol groups per molecule (cf. Book by T. S. Carswell—"Phenoplasts," published in 1947 by Interscience Publishers of New York-. Exemplary of suitable polyphenylols derived from a phenol and an unsaturated aldehyde such as acrolein are the triphenylols, pentaphenylols and heptaphenylols described in U.S. Patent 2,801,989.

The phenols may contain alkyl, aryl or halogen ring substituents. These compounds are exemplified by the alkyl resorcinols, the tribromo resorcinols and the substituted diphenols of the Bender et al. Patent 2,506,486.

Examples of the polymeric type polyepoxides include the glycidyl polyethers of polyhydric phenols obtained by reacting, preferably in an alkaline medium, a polyhydric phenol and 1-2 moles of an epihalohydrin per each phenolic hydroxyl group. Illustrative of this particular type compound is the polyether obtained on reacting 1 mole of bis(4-hydroxyphenyl)dimethylmethane with 1.5 moles of epichlorohydrin in the presence of an alkaline catalyst.

Among agent suitable for curing the polyepoxide compositions are compounds containing reactive hydrogen, such as diethylamine, butylamine, N-methylaniline, phenylene diamine, 4,4'-methylene dianiline, N(2-hydroxy-2,3,3-trimethylpentyl)-diethylene triamine, metaxylylene diamine; polyhydric phenols such as 2,2-bis(p-hydroxyphenyl)propane, novolak resins, and acid anhydrides such as hexahydrophthalic acid anhydride, chlorendic anhydride and methylnadic anhydride. These compounds, called hardners, may be used singly or in combinations of two or more.

The hardeners are generally used in a stoichiometric amount. It is to be understood, however, that the hardeners may be used in amounts ranging from about 80 to 150 percent of the stoichiometric amount with good results. The actual amount used depends on the particular composition which is to be cured.

For purposes of stoichiometric calculations, one epoxy group is considered to react with one reactive hydrogen.

Illustrative of so-called "catalysts" which cause the polyepoxide to self-polymerize, or which increase the speed of reaction between a hardener and a polyepoxide, are the following: alphamethylbenzyldimethylamine, diethylaminopropylamine, dimethylaminoethylphenol, methyldimethylamine, dimethylaminoethylphenol and triethanolamine.

The amount of catalyst is usually less than a stoichiometric amount. Generally, as little as 1/10 of one percent based on the weight of the polyepoxide used is sufficient to catalyze the curing reaction in a reasonable time. Adding more than a stoichiometric amount does not materially increase the rate of the hardening reaction and is economically unsound. Again, the actual amount of catalyst used will depend upon the composition which is to be cured.

The catalyst agents may be used singly or in combinations of two or more.

Filler material, dyes, pigments and other modifying agents can be added to the polyepoxide compositions. The filler material improves the strength, the heat resistance and chemical resistance of the final polyepoxide product. Filler is also added as an economical measure decreasing the amount of the more expensive polyepoxide in the compositions.

The fillers which may be used include, among others: silica, powdered aluminum, powdered iron, powdered alumina, Portland cement, silica carbide, iron oxide, nylon and mica.

The modifying materials may also be used singly or in combinations of two or more.

The following examples further illustrates this invention:

EXAMPLE I

A. One hundred grams of Zeolite X having 13 A.

diameter pores and a particle size small enough to pass through a 325-mesh sieve were added to 1500 milliliters of benzene in a flask. The slurry was agitated while adding 50 milliliters of triethanolamine. The mixture was heated and refluxed for two hours with continuous agitation. The slurry was thereafter filtered, the filter cake washed with benzene and the excess benzene removed by placing the filter cake under reduced pressure of 27 inches of mercury and allowing to stand overnight. A Kjeldahl test was run on the dried filter cake, and the amount of adsorbed triethanolamine calculated from the nitrogen content in the material. The product was found to have contained 23.7 percent of triethanolamine.

B. Equal parts of the product described above and molten polyethylene having a specific gravity of 0.90 and a melt index of 250 were blended by tumbling the two components together for ten minutes at room temperature. The mix was then hot compounded on a differential speed two roll mill. The front roll of the two roll mill was maintained at a temperature of 180° F. while the back roll was kept at a temperature of 230° F. The material was sheeted off the rolls, cooled at room temperature, and granulated to a 6-mesh particle size.

EXAMPLE II

The product of Example IA was coated by a molten polyethylene having a specific gravity of 0.90 and a melt index of 250 according to the procedure described in Example IB wherein two parts by weight of the adsorption product was used per each part by weight of the polyethylene.

EXAMPLE III

The product of Example IA was coated, by the process described in Example IB, with molten polyethylene having a specific gravity of between 0.92 and 0.93 and a melt index of about 20 wherein 1 part by weight of the product was used per part by weight of the polyethylene.

EXAMPLE IV

The product of Example IA was coated with molten "Carbowax 6000," a commercial polyethylene glycol having an average molecular weight of 7000. The Carbowax 6000 was melted in a beaker and an equal amount of weight of the adsorption product was then stirred into the beaker over a ten-minute period with vigorous stirring. The material was then cooled and granulated to a 6-mesh particle size.

EXAMPLE V

Four parts by weight of the product of Example IB was admixed with 22 parts by weight of an epoxidized novolak, having an epoxy equivalent weight of 220, 11 parts by weight of a phenolic resin, 62 parts by weight of silica and 1 part by weight of calcium stearate, the stearate acting as a mold release agent.

The novolak, having an average molecular weight of 600, was prepared by condensing 100 parts by weight of phenol with 72 parts by weight of a 37 percent aqueous formalin solution in the presence of a catalytic amount of oxalic acid. The condensate was dehydrated to a solid product which was ground into a powder. The novolak was fed to a still containing a stoichiometric excess of epichlorohydrin and also containing ethyl alcohol. The mixture was heated to a temperature of between 60°–65° C. and held at this temperature until all of the novolak resin had dissolved. A controlled amount of caustic soda was then added to the mix whereby the epichlorohydrin and novolak reacted to form the corresponding intermediate chlorohydrin ether. The chlorohydrin ether was dehydrochlorinated by the addition thereto of a stoichiometric amount of sodium hydroxide whereby the epoxidized novolak product was obtained.

The phenolic resin which was used as hardener for the polyepoxide was a solid, grindable novolak resin having a molecular weight of about 650 and was prepared by condensing 100 parts by weight of phenol with 73 parts by weight of a 37 percent aqueous formalin solution in the presence of a catalytic amount of oxalic acid. The condensate was neutralized with lime, with the water being distilled off.

The latent acting curing system of Example IB, the epoxidized novolak, the phenolic resin, filler and calcium stearate, was blended for fifteen minutes in a ribbon-type mixer. The mix was thereafter compounded on a differential speed two roll mill for two minutes. The front roll was kept at a temperature of between 170°–180° F.; the rear roll at a temperature of between 220°–230° F. The material was pulled off the roll mill in the form of a sheet, allowed to cool to room temperature and then ground to 16-mesh particle size.

EXAMPLE VI

A molding composition was prepared according to the process of Example V wherein 3 parts by weight of the product of Example II was admixed with 22 parts by weight of the epoxidized novolak, 11 parts by weight of the phenolic resin, 1 part by weight of calcium stearate and 63 parts by weight of silica. The epoxidized novolak and phenolic resin were previously described in Example V.

EXAMPLE VII

A molding composition was prepared according to the process of Example V wherein 6 parts by weight of the product of Example III was admixed with 22 parts by weight of the epoxidized novolak, 11 parts by weight of the phenolic resin, both compounds being described in Example V, and 61 parts by weight of silica filler.

EXAMPLE VIII

A molding composition was prepared according to the process described in Example V by admixing 6 parts by weight of the product of Example IV with 22 parts by weight of the epoxidized novolak, 11 parts by weight of the phenolic resin, both compounds being described in Example V, and 61 parts by weight of silica filler.

EXAMPLE IX

A molding composition was prepared according to the process described in Example V by admixing 4 parts by weight of the product of Example IB with 13 parts by weight of 3,4-epoxy-6-methylcyclohexylmethyl-3,4-epoxy-6-methylcyclohexanecarboxylate, 17 parts by weight of chlorendic anhydride, 1 part by weight of calcium stearate and 65 parts by weight of silica flour.

The molding compositions of Examples V, VI, VII, VIII, and IX were subjected to a "cup closing time" test to determine whether or not the compositions had a satisfactory storage life. This test consists in molding a two inch ASTM–D–731–50 cup with a 2 percent fixed overcharge at a fixed pressure of 10,000 p.s.i. The time required for the press to close from a flash thickness of 50 mils to 6 mils is measured.

A longer cup closing time indicates that the composition has advanced more closely to an infusible, unworkable state. A composition which has advanced toward an infusible, unworkable state, as indicated by a long cup closing time after a short storage period, has an unsatisfactory storage life.

The cup closing time of polyepoxide compositions containing my latent chemical acting agents as compared to the polyepoxide compositions containing other type systems has been determined and is tabulated below. The epoxidized novolak and phenol hardener have been described in Example V. All the compositions were prepared by the procedure described in Example V.

The "cup closing time" in seconds was determined after various storage intervals. The cup closing times noted correspond to the storage times directly opposite therefrom.

EXAMPLE X

*Molding composition of Example V*

| Days stored at 37.8° C.: | Cup closing time, in seconds |
|---|---|
| 0 | 1.7 |
| 1 | 1.8 |
| 2 | 1.9 |
| 3 | 2.0 |
| 4 | 2.4 |
| 7 | 4.0 |
| 8 | 4.8 |
| 10 | 4.4 |
| 11 | 4.8 |
| 18 | 5.0 |
| 25 | 6.6 |
| 32 | 8.2 |
| 49 | 9.2 |
| 73 | 10.6 |

At the end of the 73rd day composition was still fusible.

The same composition was used as is indicated in Example X for obtaining the data tabulated below with the exception that the molecular sieve, containing the curing agent, was not encased in a coating material.

| Days stored at 37.8° C.: | Cup closing time, in seconds |
|---|---|
| 0 | 1.3 |
| 1 | 1.5 |
| 2 | 2.0 |
| 5 | 4.3 |
| 6 | 5.0 |
| 7 | 5.7 |
| 8 | 5.8 |
| 9 | 5.9 |
| 12 | 7.2 |
| 13 | 7.1 |
| 14 | 7.7 |
| 15 | 7.9 |
| 16 | 7.7 |
| 19 | 9.2 |
| 26 | 12.2 |

The above-described composition became infusible in 27 days.

EXAMPLE XI

*Composition of Example VII*

| Days stored at 37.8° C.: | Cup closing time, in seconds |
|---|---|
| 0 | 1.8 |
| 1 | 1.9 |
| 2 | 2.3 |
| 3 | 2.8 |
| 4 | 3.0 |
| 8 | 4.2 |
| 9 | 4.0 |
| 10 | 4.2 |
| 11 | 4.5 |
| 12 | 4.4 |
| 14 | 5.6 |
| 15 | 5.6 |
| 18 | 6.0 |
| 28 | 7.0 |
| 32 | 7.7 |

The composition was still fusible at the end of the 32nd day.

An anlysis of the above-noted data indicates that polyepoxide compositions containing the latent chemical acting agents of my invention have a satisfactory storage life as they remain fusible for relatively long periods of time. The tabulated data also indicates that epoxide compositions containing other type chemical systems have relatively long "cup closing time" values, indicating relatively short storage lives.

Polyepoxide compositions containing my latent chemical acting system not only have a long storage life, but are also cured rapidly once the barrier coating is made discontinuous and the curing agent, usually under the influence of heat, is driven from the molecular sieve carrier.

In order to more fully illustrate the satisfactory cure speed of our latent acting system in polyepoxide compositions, cure speeds of such compositions were determined by the Apparent Modulus of Elasticity Test. This test consists in molding a bar of material having dimensions of 1 inch by ⅛ inch and 5 inches under a molding pressure of 2,000 p.s.i., at a temperature of 175° C. and a cure time of from 2½ to 4 minutes. The bar was maintained at the molding temperature and a load placed at the middle of the bar.

The Apparent Modulus of Elasticity (E) is calculated from the expression:

$$E = \frac{Fh^3}{4 \cdot D \cdot W \cdot T}$$

where F is the applied load in pounds; $h$ is the length of the span under stress expressed in inches; D is the deflection in inches; W and T are the width and thickness of the bar, respectively, in inches.

A material which cures rapidly to an infusible, unworkable product has less deflection and consequently a larger (E) value.

A composition having a value for (E) of about 20,000 pounds per square inch for a cure time of 2 minutes and a value for (E) of about 30,000 pounds per square inch for a cure time of 4 minutes, is deemed to have a satisfactory cure speed.

The following tabulated data clearly shows that the cure speed of compositions containing the latent acting agents of my invention have a commercially satisfactory cure speed.

| Compositions | Molding Temperature, °C. | Curing Time in Minutes | (E) Pounds per Square Inch |
|---|---|---|---|
| Composition of Example V (containing the latent acting system of my invention) | 175 | 2½ | 24,000 |
| Do | 175 | 4 | 42,500 |

The polyepoxide compositions are of particular value as casting resins, potting compounds, and adhesive binders. These compositions also find use as laminating resins, surface coatings or finishes, and as molding compositions.

What is claimed is:

1. A polyepoxide composition containing a polyepoxide having an average of more than one epoxy group per molecule wherein each epoxy oxygen atom is attached to adjacent carbon atoms and a latent chemical acting system comprising a curing agent for curing said composition to an infusible, insoluble state, a molecular zeolite sieve carrier into which said curing agent is adsorbed and a normally solid material coating the said curing agent containing molecular sieve said coating acting as a mechanical barrier between the polyepoxide and the curing agent.

2. A polyepoxide composition as defined in claim 1, wherein the curing agent is triethanolamine.

3. A polyepoxide composition as defined in claim 1, wherein the coating material is polyethylene.

4. A polyepoxide composition as defined in claim 1, wherein the coating material is a polyethylene glycol.

5. A polyepoxide composition as defined in claim 1, wherein the curing agent is an amine.

6. Process for curing a polyepoxide composition containing a polyepoxide having an average of more than one epoxy group per molecule wherein each epoxy oxygen atom is attached to adjacent carbon atoms which comprises admixing said composition with a latent chemical acting system comprising a curing agent for curing said composition to an infusible, insoluble state, a molecular zeolite sieve carrier into which said curing agent is adsorbed and a normally solid material coating said curing agent-containing molecular sieve carrier and serving as a mechanical barrier between the polyepoxide composition and the curing agent, heating said mixture to a temperature sufficient to melt said coating allowing the curing agent freedom of movement from the molecular sieve carrier, said temperature being sufficiently high to drive said curing agent from said carrier whereby the curing agent comes into contact with the polyepoxide composition and said composition cures to an infusible, insoluble state.

7. Process as defined in claim 6, wherein the curing agent is triethanolamine.

8. Process as defined in claim 6, wherein the coating material is polyethylene.

9. Process as defined in claim 6, wherein the coating material is a polyethylene glycol.

10. A latent chemical acting system particularly adaptable, upon activation, for curing a polyepoxide composition comprising a curing agent for curing said composition to an infusible, insoluble state, a molecular zeolite sieve carrier into which said curing agent is adsorbed and a normally solid material coating said curing agent containing carrier, said coating acting as a mechanical barrier preventing movement of said curing agent from said molecular sieve carrier.

11. A latent chemical acting system as defined in claim 10, wherein the chemical agent is triethanolamine.

12. A latent chemical acting system as defined in claim 10, wherein the coating material is polyethylene.

13. A latent chemical acting system as defined in claim 10, wherein the coating material is a polyethylene glycol.

14. A latent chemical acting system as defined in claim 10, wherein the curing agent is an amine.

15. A latent chemical acting system comprising a molecular zeolite sieve containing triethanolamine, said sieve encased in a polyethylene coating.

16. A latent chemical acting system comprising a molecular zeolite sieve containing triethanolamine, said sieve encased in a polyethylene glycol coating.

References Cited in the file of this patent

UNITED STATES PATENTS

| | | |
|---|---|---|
| 2,142,980 | Huijser et al. | Jan. 3, 1939 |
| 2,406,869 | Upham | Sept. 3, 1946 |
| 2,528,933 | Wiles | Nov. 7, 1950 |
| 2,768,992 | Zukas | Oct. 30, 1956 |
| 2,773,043 | Zukas | Dec. 4, 1956 |
| 2,871,222 | Finestone | Jan. 27, 1959 |
| 2,882,244 | Milton | Apr. 14, 1959 |
| 2,904,607 | Mattox et al. | Sept. 15, 1959 |

FOREIGN PATENTS

| | | |
|---|---|---|
| 583,471 | Great Britain | Dec. 19, 1946 |